Dec. 13, 1966     D. M. SENCABAUGH     3,291,528

SEAT BELT STRAIGHTENER

Filed Oct. 19, 1965

*INVENTOR.*
DWIGHT M. SENCABAUGH
*BY* Hoffmann and Yocent

ATTORNEYS

United States Patent Office 3,291,528
Patented Dec. 13, 1966

3,291,528
SEAT BELT STRAIGHTENER
Dwight M. Sencabaugh, 15319 Edgewater Drive,
Lakewood, Ohio
Filed Oct. 19, 1965, Ser. No. 497,768
10 Claims. (Cl. 297—385)

The present invention relates to seat belts of the type used in automotive and aircraft vehicles.

Seat belts which are installed in automotive or aircraft vehicles often become twisted when not in use and in many instances seat belts are secured about the passenger in a twisted condition. When a twisted portion of the belt is in engagement with the body of the passenger, the twisted portion exerts a high unit pressure on the body of the passenger and causes discomfort. Similarly when the vehicle is rapidly decelerated, a twisted portion of the belt exerts high pressure on the body of the passenger so that pain and injury to the passenger may result from the belt itself. Moreover, when a twisted seat belt is tensioned in response to deceleration of the vehicle it tends to untwist which causes a fastening device, such as a buckle, to turn and gouge the passenger.

Many buckles for seat belts are designed so that the belt may be secured about the passenger regardless of the relation of the buckle to the body of the passenger. When the seat belt associated with such a buckle is twisted, the seat belt may be secured in such a way that a buckle release mechanism is engaged with, or faces, the body of the passenger. A belt which has been secured in such a manner is difficult, if not impossible, to release quickly when the belt is in tension around the body of the passenger, and may prevent the passenger from escaping from the vehicle subsequent to a crash.

Accordingly a principal object of the present invention is the provision of a new and improved seat belt assembly which is adapted to be secured about a user and which includes a seat belt straightener having a seat belt passage therethrough which includes belt engaging portions and which is constructed and arranged to be stiff relative to the belt member and manually slidable on the belt member to untwist the belt member prior to use.

Another of the principal objects of the present invention is the provision of a new and improved straightener for seat belts which is operative to unwind twists in seat belt members and which is simple in construction and inexpensively manufactured.

Another object of the present invention is the provision of a new and improved straightener for seat belts which is constructed and arranged to provide a seat belt passage therethrough including a belt engaging portion and which is manually slidable on a seat belt member to untwist the seat belt member prior to securing the seat belt assembly about the user.

Another object of the present invention is the provision of a new and improved seat belt assembly in accordance with the next preceding object and wherein the straightener detachably surrounds the seat belt member.

Other objects and advantages of the present invention will become apparent from the consideration of the detailed description thereof and of the drawings which form a part of the specification and in which.

Figure 4:
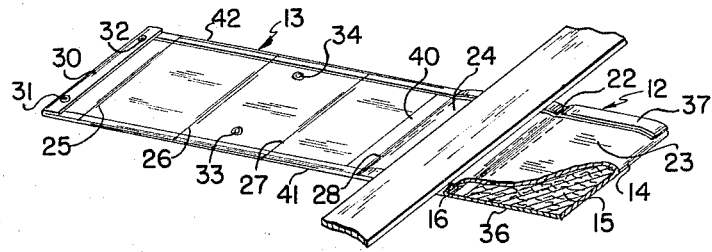
FIG. 4 is a perspective view of a straightener for seat belts embodying the present invention having parts in section and shown prior to assembly on a seat belt.

A seat belt assembly and straightener for seat belts or straps of the character herein described are particularly useful when installed in an automotive or aircraft vehicle. In conventional seat belt installations, seat belts which are not in use lie either on the seat of the vehicle or on the vehicle floor and commonly become twisted during periods of disuse.

Referring to the drawings, a seat belt assembly A embodying the present invention is shown as it might be found in the aforementioned vehicles. The seat belt assembly A includes a straightener 10 which surrounds a seat belt member 11 and is manually slidable with respect to the belt member. The straightener 10 is formed from a sheet of material which is flexible and easily folded such as leather or a synthetic material having property similar to leather. The straightener 10 includes a belt engaging member 12 and a shroud member 13 connected thereto. The belt engaging member 12 includes a pocket portion 14 and pad members 15 and 16 positioned in the pocket portion. The shroud member is wrapped around the belt engaging member and secured thereto so that the straightener 10 forms a unitary body.

Figure 1:
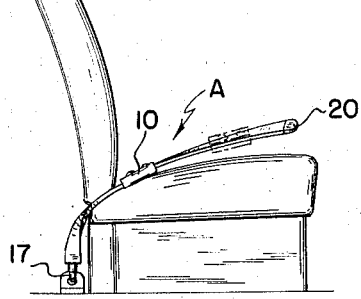
FIG. 1 is an elevation view of a portion of a vehicle including a seat belt assembly embodying the present invention.
Figure 2:
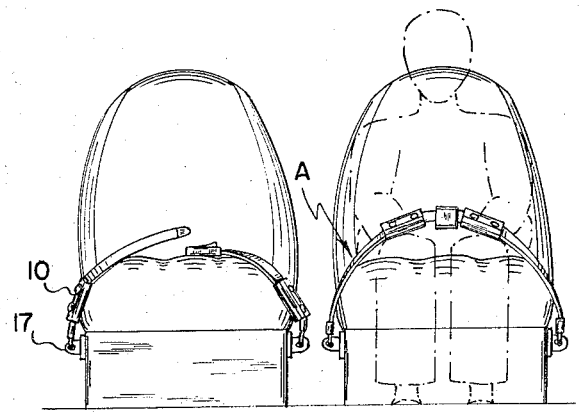
FIG. 2 is an elevation view of a vehicle including a seat belt embodying the present invention.
Figure 3:
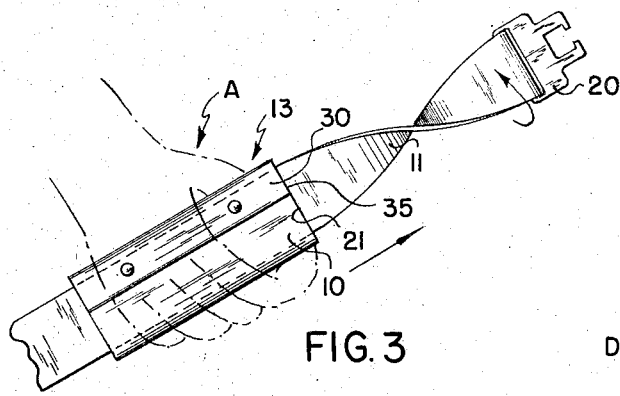
FIG. 3 is a perspective view of a belt straightener embodying the present invention in its operative relation with a seat belt member.

When the seat belt assembly is not being used, the straightener 10 is positioned on a belt member 11 nearest the end 17 of the belt which is connected to the vehicle, this position is indicated by phantom lines in FIGS. 1 and 2. When the passenger is seated and fastening of the seat belt is desirable, or required, the passenger grasps the straightener 10 and slides the straightener along the seat belt 11 from its first position to a second position adjacent a free end 20 of the belt as the straightener is slid from the first position to its second position a relatively stiff leading edge 21 of the straightener will cause any twists or kinks between the straightener and the free end of the belt to be straightened as a result of this movement. When the seat belt assembly A is secured about the passenger, the straightener 10 is in its second position adjacent the connection between the ends of the seat belt members of the seat belt assembly. In this position the straightener 10 engages the body of the passenger such that the straightener forms a pad or cushion between the body of the passenger and the seat belt member. Where it is no longer desired to have the seat belt assembly secured, the passenger grasps the straightener and moves it along the belt from its second to its first position. The ends of the belt members are then unfastened. During the following period of disuse of the seat belt assembly, the belt members may become twisted and kinked as described hereinbefore but movement of the straightener from its first to its second position prior to resecuring the assembly about the body of the passenger removes such twists and kinks.

The seat belt assembly A may have a straightener 10 associated therewith as a permanent part of a seat belt assembly and, as such, not easily removable from the assembly. In the illustrated and the preferred embodiment, the straightener 10 may be removed from the seat belt member for the purpose of replacement or for interchanging straighteners between different seat belt assemblies.

A removable straightener and its relation with a seat belt member 11 prior to assembling the straightener 10 on the seat belt member is illustrated in FIG. 4. The belt member 1 is placed across the pocket portion 14 of the belt engaging member 12 and the pocket portion is folded along the fold line 22 so that the belt is sandwiched between belt engaging surfaces 23 and 24 of the pocket member. When the pocket member has been folded in this manner about the belt member, shroud member 13 is wrapped around the folded pocket portion and bent along fold lines 25, 26, 27 and 28 during this wrapping process. The shroud member 13 is such length that an end 30 of the shroud member extends partially across the folded body of the straightener 10. The end of the shroud member includes snap fastener members 31 and 32 connected thereto. The aforementioned snap fastener parts 31 and 32 are aligned with mating fastener parts 33 and 34 connected to the body of the straightener between fold lines 26 and 27 so that the shroud member may be removably connected about the folded pocket portion 14 and belt member 11. In its assembled form the straightener 10 includes a passage 35 therethrough and through which belt member 11 slidably extends. Passage 35 has leading and trailing edges on opposite sides thereof formed by sides 36 and 37 of the pocket member.

Pad members 15 and 16 are formed from a compressible fibrous material such as felt, are rectangular in shape and extend between sides 36 and 37 of the pocket portion. The pad members 15 and 16 have a width corresponding to the width of a conventional seat belt and are separated in the pocket portion by a gap such that the pocket portion may be folded along the fold line 22 about the belt member 11. When the pocket portion is folded about the seat belt member 11, the pad members 15 and 16 support belt engaging surfaces 23 and 24 respectively. Since the pad members 15 and 16 extend to the sides 36 and 37 of the pocket portion, they cause leading and trailing edges of the passage 35 to be relatively stiff as compared with the material of the seat belt member such that as the seat belt member 11 is moved through the passage 35 the twists in the belt member will not be communicated to the straightener since the stiff leading and trailing edges will not assume the shape of the belt member. Further, the pad members 15 and 16 serve to stiffen the straightener 10 such that the straightener in its assembled form is stiffer than the seat belt upon which it is assembled, yet the stiffener is sufficiently soft and pliable to produce a cushion effect between the belt and the body of the passenger.

In the preferred embodiment, sides 36 and 37 of the pocket member are formed by a double thickness fold of the material of the straightener. The overlapping folded material may be adhesively secured or stitched to the ends of the belt engaging surfaces 23 and 24. End 40 of the pocket member is closed by stitching or an adhesive to prevent pad members 15 and 16 from being dislodged from the pocket member. Sides 41 and 42 and end 40 of the shroud member are preferably formed by a folded over portion of the straightener material which may be stitched or adhesively secured in position.

From the foregoing description of the preferred embodiment of the invention it will be apparent that the objects heretofore enumerated and others have been accomplished and that there has been provided a novel and improved straightener for seat belts. While the preferred embodiment of the present invention has been described in considerable detail, the invention is not to be considered to be limited to the precise construction shown. The shroud member, for example, need not cover the entire belt engaging member but may consist of separate strap members which surround the belt engaging member. Additionally, although a seat belt assembly having a belt straightener on each of the belt members has been illustrated, it should be apparent that a seat belt assembly including only one straightener could be provided. In that event, of course, it would be preferable to include the belt straightener on the belt member which carries the buckle. My intention is to cover hereby all adaptations, modifications and uses of the straightener shown which come within the practice of those skilled in the art to which the invention relates and within the scope of the appended claims.

Having described my invention, I claim:

1. A seat belt assembly adapted to be installed in a vehicle and including first and second belt means, each of said belt means including an end portion secured to said vehicle, means for detachably connecting said first belt means to said second belt means, and a manually engageable belt straightener slidably connected to one of said seat belt members including a body member having a passage therethrough and through which said one belt member extends and means on said body member adjacent said passage for engaging and guiding said belt member as said belt member moves through said passage to straighten twists in said belt member as said body is moved on said belt member toward a free end thereof.

2. A seat belt assembly adapted to be installed in a vehicle and including first and second belt means, each of said belt means including an end portion secured to said vehicle, means for detachably connecting said first belt means to said second belt means, and a manually engageable belt straightener slidably connected to one of said seat belt members including a body member having a passage therethrough and through which said one belt member extends and means on said body member adjacent said passage for engaging and guiding said belt member as said belt member moves through said passage to straighten twists in said belt member as said body is moved on said belt member toward a free end thereof, said belt engaging means including belt engaging portions on said body member in contact with opposite sides of said belt.

3. A seat belt assembly adapted to be installed in a vehicle and including first and second belt means, each of said belt means including an end portion secured to said vehicle, means for detachably connecting said first belt means to said second belt means, and a manually engageable belt straightener slidably connected to one of said seat belt members including a body member having a passage therethrough and through which said one belt member extends and means on said body member adjacent said passage for engaging and guiding said belt member as said belt member moves through said passage to straighten twists in said belt member as said body is moved on said belt member toward a free end thereof said belt engaging means including a belt engaging portion at a side of said belt and portions extending about edges of said belt.

4. A seat belt assembly adapted to be installed in a vehicle and including first and second belt means, each of said belt means including an end portion secured to said vehicle, means for detachably connecting said first belt means to said second belt means, and a manually engageable belt straightener slidably connected to one of said seat belt members including a body member having a passage therethrough and through which said one belt member extends and means on said body member adjacent said passage for engaging and guiding said belt member as said belt member moves through said passage to straighten twists in said belt member as said body is moved on said belt member toward a free end thereof, said belt engaging means including opposed belt engaging portions on opposite sides of said belt member, one of said belt engaging members including portions extending about edges of said belt member.

5. In a manually engageable seat belt straightener adapted to be slidably connected to a seat belt member, a body member having a passage therethrough and through which said belt member is adapted to extend, and means on said body member adjacent said passage for engaging and guiding said belt member as said belt member moves through said passage to straighten twists in said belt member as said body is moved on said belt member toward a free end thereof.

6. In a manually engageable seat belt straightener adapted to be slidably connected to a seat belt member, a body member having a passage therethrough and through which said belt member is adapted to extend, and means on said body member adjacent said passage for engaging and guiding said belt member as said belt member moves through said passage to straighten twists in said belt member as said body is moved on said belt member toward a free end thereof said belt engaging means including a belt engaging portion on one side of said belt and portions extending from said belt engaging portion about edges of said belt member.

7. In a belt straightener adapted to be slidably connected to a seat belt member, a manually engageable body member having a passage therethrough and through which said belt member is adapted to extend, and means on said body member adjacent said passage for engaging and guiding said belt member in said passage to straighten twists in said belt member as said body is moved on said belt member toward a free end thereof, said means including first and second opposed belt engaging members positioned on opposite sides of said belt member.

8. In a manually engageable seat belt straightener adapted to be slidably connected to a seat belt member, a body member having a passage therethrough and through which said belt member is adapted to extend, and means on said body member adjacent said passage for engaging and guiding said belt member as said belt member moves through said passage to straighten twists in said belt member as said body is moved on said belt member toward a free end thereof, said belt engaging means including a belt engaging portion forming a part of said passage and portions extending from said belt engaging portion about edes of said belt member, said body member including pad members for supporting said belt engaging portion.

9. In a seat belt straightener adapted to be slidably connected to a seat belt member, a body member and a shroud member connected to said body member, said body member including a pocket portion having first and second pad members therein, said pocket portion being folded to provide a passage through said straightener having opposed side walls formed by said folded pocket portion and said pad members, said shroud member surrounding said body member and including a portion forming a wall of said passage whereby said seat belt member is slidable in said passage to straighten twists in said belt member as said body is moved on said belt member toward a free end thereof.

10. In a seat belt straightener adapted to be slidably connected to a seat belt member, a body member, a shroud member connected to said body member, said body member including a pocket portion having first and second pad members therein, said pocket portion being folded to provide a passage through said straightener having opposed side walls formed by said folded pocket portion and said pad members, said shroud member surrounding said body member and including a portion forming a wall of said passage, and fastening means for detachably holding said shroud member in surrounding relation with said body member whereby said seat belt member is slidable in said passage to straighten twists in said belt member as said body is moved on said belt member toward a free end thereof.

References Cited by the Examiner

UNITED STATES PATENTS

| | | | |
|---|---|---|---|
| 718,948 | 1/1903 | Green | 297—385 |
| 2,763,004 | 9/1956 | Sanders | 2—2 |
| 2,829,849 | 4/1958 | Plath | 244—151 |
| 2,960,137 | 11/1960 | Lipsitz | 150—52 |
| 2,998,008 | 8/1961 | Kelsa | 128—133 |

FRANK B. SHERRY, *Primary Examiner.*

J. T. McCALL, *Assistant Examiner.*